May 6, 1930.  J. B. HENDERSON  1,757,800
BALLISTIC APPARATUS
Filed Oct. 18, 1924
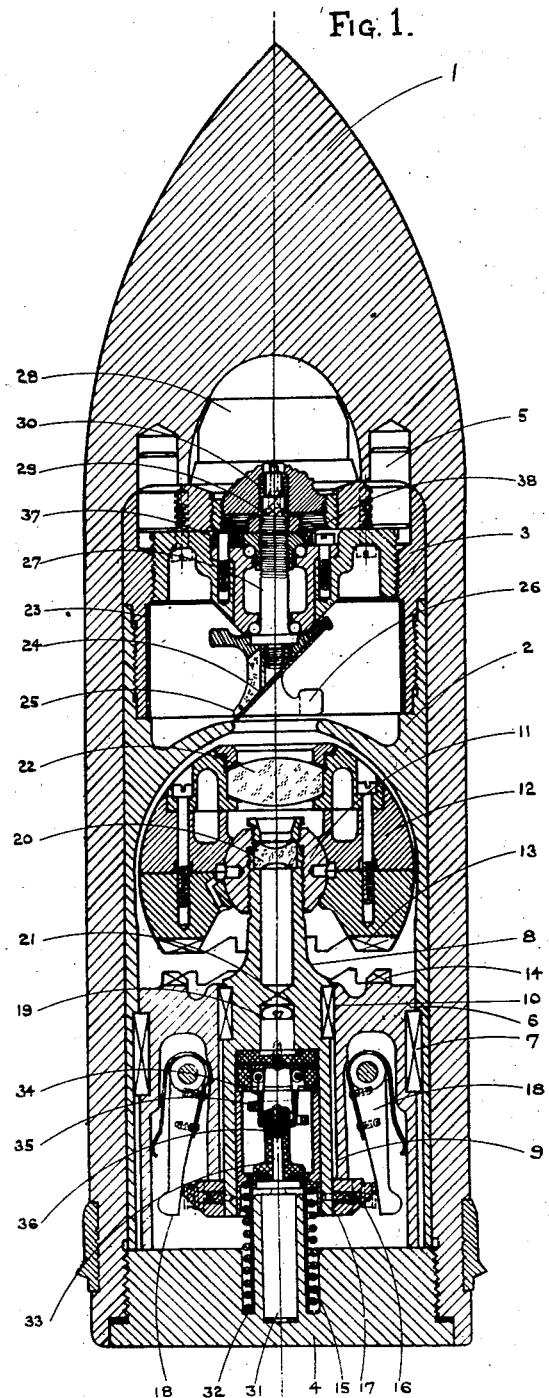
Inventor
James B. Henderson
By Moakley & Gill
Attorneys Patented May 6, 1930

1,757,800

UNITED STATES PATENT OFFICE

JAMES BLACKLOCK HENDERSON, OF BLACKHEATH, ENGLAND

BALLISTIC APPARATUS

Application filed October 18, 1924, Serial No. 744,466, and in Great Britain August 9, 1922.

My invention relates to methods of determining the external ballistics of the flight of a projectile through the air and more particularly to methods of measuring, by records taken inside the projectile during its flight, the resistance to the flight and the spiral precessional motion which that resistance produces in a spinning projectile fired from a rifled gun.

In order to measure the spiral precessional motion I employ an auxiliary gyroscope inside the shell, spun by the rotation of the shell during its rapid acceleration through the gun, the gyroscope being driven by the shell through a suitable arrangement of clutch with a spring de-clutching device to free the gyroscope from the shell when the muzzle of the gun is reached. During the flight of the shell the gyroscope will maintain a constant direction in space and I record the precessional motion of the shell round it by a suitable recorder. This recorder may consist of a stylus making a mark on the wall of the shell. I prefer, however, to record the motion photographically in a manner which I shall describe in detail.

To measure the variation of velocity of the shell I may support a small mass inside the shell by means of springs and measure the deflection of the springs by any suitable recording device. Such a record of spring deflection would be a record of deceleration of the shell from which a record of change of velocity would have to be obtained by integration. For that reason I prefer and shall describe another method by which I obtain a direct record of the change of velocity. I employ a mass inside the shell capable of movement relatively thereto in an axial direction against a resistance such that the relative movement of the mass and the shell is proportional to the change of velocity of the latter, a record of such movement being taken on the surface of the mass by a stylus attached to the shell, or vice versa.

In the accompanying drawings I show my preferred methods of obtaining the records referred to above.

Fig. 1 is a sectional elevation of a shell containing the gyroscopic apparatus required to record the precessional motion of the shell during flight.

Fig. 2 is a conventional representation of the automatic record made by the mechanism illustrated in Fig. 1.

Fig. 3 is a sectional elevation of the apparatus which I insert inside a shell to record the change of velocity of the latter.

Fig. 4 is a detail of the circuit closing means for the lamp.

In Fig. 1 the shell body 1 contains the casing 2 and photographic camera 3 jammed tightly between the nose of the shell and the screwed base 4. The rotational motion of the shell is imparted to the camera 3 and casing 2 by the pins 5. Within the case 2 is an inner sleeve 6 which is prevented from rotating relatively to the shell by the feathers 7 in keyways in the casing 2. The sleeve 6 carries a spindle 8 which is coaxial with the shell and is a good sliding fit in a cylindrical bearing 9 which is part of the sleeve 6, but is prevented from rotating therein by the feathers 10. At its forward end the spindle 8 carries a ball 11 which forms a spherical bearing for the gyroscope rotor 12, the latter being made in two parts bolted together for ease of assembly on its spherical bearing. The rear end of the gyroscope is furnished with ratchet teeth 13 through which it acquires its rotational velocity from the corresponding teeth 14 on the front of the sleeve 6. Between the rear end of the spindle 8 and shell base 4 is a helical spring 15. Secured to the spindle 8 by two small set screws 16 is a ring 17, and mounted on the sleeve 6 are two spring-operated pawls 18. Before firing the shell the spindle 8 is drawn back, compressing the spring 15 until the pawls 18 engage with the ring 17. In this position the ratchet teeth 13 and 14 are engaged. During the acceleration of the shell in the gun centrifugal force throws the pawls 18 out of engagement with the ring 17 but the teeth 13 and 14 remain enmeshed until acceleration of the shell ceases. The shell and gyroscope therefore leave the gun with the same rotational velocity but when deceleration of the shell commences after leaving the muzzle, the spring 15 thrusts the spindle 8 and rotor 12 forward into the position illustrated, the forward movement being limited by the ring 17 coming against the rear of the sleeve 6. In this position the teeth 13 and 14 are free of each other and the gyroscope is free of the shell as regards rotation.

When the shell strikes the ground or water the two screws 16 are sheered by the impact and the gyroscope moves further forward into contact with the spherical inner surface of the case 2 which acts as a brake to bring the rotor to rest.

To record the spiral precessional motion of the shell round the rotor axis, I have devised the photographic method illustrated, which I prefer to other methods as it involves no friction on the gyroscope. A small electric lamp 19, a negative lens 20 and a small aperture diaphragm 21 are housed within the hollow spindle 8. The gyroscope carries a positive lens 22, and inside the camera 3 is a sensitized cylindrical metal surface 23 on to which an image of the illuminated aperture of the diaphragm 21, formed by the two lenses 20 and 22, is reflected by a mirror 24 which is inclined at 45° to the axis of the shell. The mirror in its frame 25 which is fitted with balanced inertia masses 26 is carried by a shaft 27 that is coaxial with the shell, which shaft is slowly rotated relatively to the shell by clockwork 28, which may be that of the time-fuse through the ratchet-tooth coupling 29, the mirror making one complete revolution relatively to the shell in, say, 5, 10, 15 or 20 seconds according to the length of record which it is possible to read satisfactorily. The coupling 29 is held in engagement by the small helical spring 30.

The lamp 19 is energized by a single dry cell 31 of special construction which is retained in the base 4 by the backward reaction of the spring 15 on the flanged sleeve 32 holding the lamp switch contact pin 33. The lamp switch consists of two pivoted levers 34 each of which is fitted with a weighted ring 35 encircling but clear of the pin 33, which causes the levers to be pressed into contact with the contact ring 36 on the pin 33 by centrifugal force when the shell is spinning and the gyroscope in the position illustrated. Thus, in Figs. 1 and 4 the pivoted right hand lever 34 has its weighted ring 35 extending towards the left far enough to clear and encircle the left hand lever 34, while the latter is similarly fitted with a weighted ring 35 which clears and surrounds the right hand lever 34. Each of the rings 35 is weighted by being made thicker at the side remote from its respective lever 34, as shown in Figs. 1 and 4, and this unequal distribution of mass is arranged to bring the center of mass of each element, consisting of a lever 34 and its attached ring 35, to the side of the central axis of the shell remote from the lever. Since under centrifugal action, any pivoted mass whose center of mass is not on the axis of rotation tends to remove its center of mass further away from that axis, it follows that, when the shell spins on its axis during its flight through the air, the centers of mass of the two pivoted elements move outwards from the axis of the shell like the balls of a cross-legged governor pulling the lever 34 from their positions shown in Fig. 4 inwards towards the axis of the shell into contact with the ring 36, as shown in Fig. 1, and so lighting the lamp 19. Before firing and after impact the levers cannot make contact with the ring 36 as they are then opposite insulating material covering the rest of the contact pin 33. The lamp will therefore be switched on automatically when the gyroscope comes into action and will be switched off on impact, the photographic record being thus confined to the period of deceleration. During the initial acceleration of the shell the torque required to spin the mirror 24 is not taken by the clockwork 28 but by pawls 37 engaging with the ratchet teeth 38 on the spindle 27. As soon as deceleration commences the pawls are released by centrifugal force and the clockwork then comes into action. The friction on the ball bearings of the mirror spindle 27 will probably decelerate the spin of the mirror much less than the air friction will decelerate the spin of the shell, in which case the mirror will drive the clock, the escapement providing the additional braking forces. These braking forces are transmitted in the mirror through the ratchet-tooth coupling 29, but as soon as the shell strikes the water and its spin is greatly decelerated the mirror can then overrun the clock since the coupling 29 is only kept in engagement by the spring 30. This device should save the clock from injury on impact.

The operation of the mechanism is as follows:—

Once deceleration has commenced the gyroscope will be free of the ratchet teeth 14 and will preserve a constant direction in space independently of the spiral precession of the shell and the droop of the trajectory. The precessional movement of the shell will cause the lens 22 to depart from the longitudinal axis of the shell while the lamp 19, diaphragm 21, lens 20 and mirror will retain their fixed position on that axis. If the mirror 24 were fixed relatively to the shell the spot of light reflected by it would move in a circular path on the sensitized surface 23 with every revolution of the shell round its own axis, but the slow rotation of the mirror which I provide draws out the record in a continuous close spiral similar to that shown in Fig. 2, which represents the sensitized surface 23 developed and laid flat, the end marked A being the commencement of the record. The radii of the "circles" are proportional to the deviation of the axes of the shell and gyroscope and the profile of the spiral illustrates graphically the precessional motion of the shell relatively to the gyroscope axis which is fixed in space.

The statement that the profile of the record illustrates the precession of the shell requires certain qualifications. In addition to the precession of the shell there are other movements affecting the curve which may, or may not, have to be taken into account. These other movements are:—

(a) Some slight inertia oscillation may be imparted to the gyroscope by the ratchet teeth 13—14 at the moment of disengagement, but any such oscillation will have a definite period which can be determined and will be recognizable in the record.

(b) The gyroscope may also have a very slow precessional movement due to friction in its spherical bearing, but the amount of this slow precession in the short time of flight should be very small.

(c) Even if the gyroscopic axis were absolutely fixed in space the deviation of the shell's axis from it would only be partly due to the precession of the shell, another factor being the droop of the trajectory. The curve of the trajectory, however, is known so that its effect on the record can be allowed for.

In connection with this question of the curved trajectory it is evident from the design of the mechanism illustrated in Fig. 1 that there are limits beyond which the mechanism would fail to work. The gyroscope has only limited freedom about axes perpendicular to the axis of the shell, so that if the shell were fired at long ranges or at high elevation a stage would be reached at which the gyroscope would foul the spindle 8 and would no longer be able to maintain its constant direction. Similarly the ray of light reflected by the mirror would ultimately fall outside the sensitized surface, or the ray emerging from the lens 22 would miss the mirror altogether. To determine the precessional movement of a shell, however, it is unnecessary to take records over the whole flight at long ranges. It is only necessary to determine the constants of the motion, which can be ascertained over a comparatively short range affording a flat trajectory and comparative freedom from disturbance of the record through precession of the gyroscope. If it were desired to take a record over ranges or at angles beyond the scope of the apparatus illustrated, the design could be altered to suit the particular case in view.

In Fig. 3 I show the much simpler mechanism I employ to record changes of velocity of the shell. 40 is a hollow case which I fit inside the shell in the same manner as the parts 2 and 3 of Fig. 1, ensuring its rotation along with the shell by means of the pins 5 of Fig. 1 fitting into holes in its nose. The rear end of the case is closed by a screwed plug 41 which may be the base-plug of the shell. Inside the front end of the case 40 and also on the inner face of the plug 41 are projections 42 and 43, in which are drilled cylindrical holes 44 and 45 coaxial with the central axis of the shell. Into these holes fits a shaft 46 which is a good sliding fit. The shaft 46 is short enough to have considerable axial movement in the holes 44 and 45 but is not short enough to become disengaged from either. Fitted to the centre of the shaft 46 is a flywheel 47 with a small clearance between its periphery and the inner wall of the case 40. Inserted through the wall of the case is a stylus 48 whose point bears against the flywheel, the stylus being situated just in rear of the front edge of the flywheel when the latter is in its rearmost position. The shaft 46 is cylindrical and is free to revolve within the shell. Through the shaft 46 along the axis of the shell I bore a capillary hole 49, and this hole and the cavities 44 and 45 I fill with oil or other viscous fluid.

During the rapid acceleration of the shell in the gun the shaft 46 and flywheel 47 are forced to the rear of the case 40, the fluid flowing through the passage 49 from the cavity 45 into the front cavity 44. When deceleration commences the shaft and flywheel tend to move forward displacing the fluid from 44 to 45, this forward movement against the viscous resistance of the fluid being proportional to the change of velocity of the shell and being automatically recorded by the stylus on the periphery of the flywheel. The shaft 46, unlike the gyroscope in Fig. 1, has no clutch connection with the shell to give it a spin but it will acquire a rotational velocity through friction. This rotational velocity, however, will be different from that of the shell and the resultant rotational movement between the shaft 46 and its bearings 44 and 45 will tend to eliminate the friction opposing the axial movement of the shaft 46.

A record obtained by the above method contains no time element. This I obtain from a separate record taken by a clockwork fuse as in Fig. 1, this record being taken photographically inside the drum 47 or on another drum connected thereto.

The action of the mechanism shown in Fig. 3 is not limited to short ranges as in the case of that illustrated in Fig. 1. By varying the velocity of the fluid I can vary the speed of the forward movement of the shaft 46 to adapt the apparatus to the range of the shell with which the experiment is being conducted.

Having now particularly described and ascertained the nature of my said invention and in what manner the same is to be performed, I declare that what I claim is:—

1. In combination, ballistic measuring apparatus, a gun projectile containing the same, said apparatus comprising a gyroscope and co-acting means respectively under the control of said gyroscope and projectile operable to measure changes in the movements of said projectile.

2. In combination, ballistic measuring apparatus, a gun projectile containing the same, said apparatus comprising a gyroscope and an optical and photographic system having portions respectively controlled by said projectile and said gyroscope to measure and automatically record the movements of the projectile.

3. In combination, ballistic measuring apparatus, a gun projectile containing the same, said apparatus comprising a clock work device, and an optical and photographic system having portions respectively controlled by said projectile and said gyroscope to automatically measure movements of the projectile during its flight, said device effecting such measure in accordance with time.

4. In combination, ballistic measuring apparatus, a gun projectile containing the same, said apparatus comprising a clockwork device, and an optical and photographic system including relative movable members, said system having portions respectively controlled by said projectile and said gyroscope to automatically measure movements of the projectile during its flight, said device being operatively connected to a member of said system to produce a time factor in such measure.

5. In combination, ballistic measuring apparatus, a projectile containing the same and adapted to spin, said apparatus including a gyroscope and being operable to measure changes in the movement of the projectile during its flight, and means effective to cause said projectile to impart rotational velocity to said gyroscope.

6. In combination, ballistic measuring apparatus, a projectile containing the same, said apparatus comprising a gyroscope, an optical and photographic system having portions respectively controlled by said projectile and gyroscope to measure and automatically record the movements of the projectile, an electric lamp co-acting with said system, a source of electric current in circuit with said lamp, and a switch in the lamp circuit automatically opened and closed by predetermined changes to the velocity of the projectile.

7. In combination, a projectile adapted to be propelled through a fluid medium with a spinning motion about an axis of the projectile initially coincident with its direction of projection through said medium, and ballistic recording apparatus contained within said projectile initially actuated by and subsequently variably correlated with the latter, said apparatus comprising means to measure the gyroscopic precessional movement of said axis due to said spinning motion.

8. In combination, a projectile adapted to be propelled from a rifled gun or the like, and gyroscopic recording apparatus contained within said projectile comprising a gyroscope having its rotor axis initially fixed in direction relatively to the initial direction of projection of said projectile, said apparatus comprising means to record the gyroscopic precession of the projectile relatively to the direction of said rotor axis during the flight of said projectile.

9. In combination, a projectile adapted to be propelled from a rifled gun or the like with a spinning motion about its axis and a linear motion along a curved trajectory, and ballistic recording apparatus contained within said projectile comprising means to record the gyroscopic precession of the projectile relatively to an axis substantially fixed in space, due to said spinning motion and to the curve of said trajectory.

JAMES BLACKLOCK HENDERSON.